(12) United States Patent
Prise

(10) Patent No.: US 8,706,054 B2
(45) Date of Patent: *Apr. 22, 2014

(54) OPERATIONAL PARAMETER SELECTION TO AVOID INTERFERENCE IN A WIRELESS COMMUNICATION SYSTEM

(71) Applicant: AT&T Mobility II LLC, Atlanta, GA (US)

(72) Inventor: Michael Edward Prise, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,948

(22) Filed: Apr. 11, 2013

(65) Prior Publication Data

US 2013/0231113 A1 Sep. 5, 2013

Related U.S. Application Data

(63) Continuation of application No. 13/445,799, filed on Apr. 12, 2012, now Pat. No. 8,422,965, which is a continuation of application No. 12/191,991, filed on Aug. 14, 2008, now Pat. No. 8,160,508.

(51) Int. Cl.
*H04B 1/40* (2006.01)

(52) U.S. Cl.
USPC ........... 455/77; 455/69; 455/414.1; 455/41.2; 455/563; 455/63.1; 455/435.1; 455/88; 370/280; 370/337

(58) Field of Classification Search
USPC ................ 455/435.1, 435.2, 69, 414.1, 41.2, 455/404.2, 456.1, 63.1, 436, 77, 78, 563, 455/88; 370/280, 337
See application file for complete search history.

(56) References Cited

U.S. PATENT DOCUMENTS

| 5,799,241 | A  | * | 8/1998 | Matsubara et al. ............. 455/62 |
| 5,950,130 | A  | * | 9/1999 | Coursey ..................... 455/432.1 |
| 6,016,427 | A  | * | 1/2000 | Barber et al. ................. 455/434 |
| 6,119,003 | A  | * | 9/2000 | Kukkohovi ................ 455/435.2 |
| 6,259,915 | B1 | * | 7/2001 | Raith ............................ 455/434 |
| 6,374,106 | B2 | * | 4/2002 | Konno et al. ............. 455/432.1 |
| 6,397,064 | B1 | * | 5/2002 | Bridges et al. ............. 455/432.3 |
| 6,546,250 | B1 | * | 4/2003 | Turcotte et al. .............. 455/437 |
| 6,625,451 | B1 | * | 9/2003 | La Medica et al. .......... 455/434 |

(Continued)

OTHER PUBLICATIONS

U.S. Office Action dated Aug. 11, 2011 in U.S. Appl. No. 12/191,991.

(Continued)

*Primary Examiner* — Marceau Milord
(74) *Attorney, Agent, or Firm* — Hartman & Citrin LLC

(57) ABSTRACT

A wireless communication device uses operational parameters stored in a capabilities list to control operation of the device. The device may also provide auxiliary services, such as reception of broadcast television signals and location detection using network assisted GPS. When auxiliary services are selected, the cellular operation may cause interference with the auxiliary services. The wireless communication device includes a reduced set of capabilities to control operation of the wireless communication device when an auxiliary service is requested. The particular set of reduced capabilities may depend on the specific type of auxiliary service that has been requested. Upon termination of the auxiliary services, the full capabilities list may be restored and the operation of the wireless communication device is thereafter controlled by the full set of operational capabilities.

20 Claims, 5 Drawing Sheets

(56) References Cited

U.S. PATENT DOCUMENTS

| | | | |
|---|---|---|---|
| 6,754,491 B2 * | 6/2004 | Konno et al. | 455/434 |
| 6,782,259 B2 * | 8/2004 | Bamburak et al. | 455/434 |
| 6,845,238 B1 * | 1/2005 | Muller | 455/436 |
| 7,068,998 B2 | 6/2006 | Zavidniak | |
| 7,257,424 B2 * | 8/2007 | Hamalainen et al. | 455/562.1 |
| 7,266,101 B2 * | 9/2007 | Dorenbosch | 370/331 |
| 7,379,748 B2 * | 5/2008 | Jansen | 455/525 |
| 7,433,929 B2 * | 10/2008 | Guilford et al. | 709/217 |
| 7,624,417 B2 * | 11/2009 | Dua | 725/114 |
| 7,676,243 B2 * | 3/2010 | Leinonen et al. | 455/550.1 |
| 2006/0184975 A1 * | 8/2006 | Casey | 725/81 |
| 2008/0020702 A1 * | 1/2008 | Jendbro et al. | 455/3.01 |
| 2008/0101297 A1 * | 5/2008 | Szini et al. | 370/332 |
| 2009/0291631 A1 * | 11/2009 | Xue et al. | 455/3.01 |

OTHER PUBLICATIONS

U.S. Notice of Allowance dated Dec. 15, 2011 in U.S. Appl. No. 12/191,991.
U.S. Office Action dated Aug. 1, 2012 in U.S. Appl. No. 13/445,799.
U.S. Notice of Allowance dated Dec. 7, 2012 in U.S. Appl. No. 13/445,799.

* cited by examiner

| FULL CAPABILITIES TABLE BAND | BROADCAST TV LIMITED CAPABILITIES TABLE BAND | GPS LIMITED CAPABILITIES TABLE CHANNEL |
|---|---|---|
| 1 | 1 | 1 |
| 2 | 2 | 2 |
| 4 | 4 | 4 |
| 5 | 5 | 5 |
| 12 |  | 12 |
| 13 | 13 |  |

FIG. 3

| BAND | NORMAL | BROADCAST TV | AGPS |
|---|---|---|---|
| 1 | ✓ | ✓ | ✓ |
| 2 | ✓ | ✓ | ✓ |
| 4 | ✓ | ✓ | ✓ |
| 5 | ✓ | ✓ | ✓ |
| 12 | ✓ |  | ✓ |
| 13 | ✓ | ✓ |  |

FIG. 4

|  |  | NORMAL | BROADCAST TELEVISION | AGPS |
|---|---|---|---|---|
| BAND | 1 | ✓ | ✓ | ✓ |
|  | 2 | ✓ | ✓ | ✓ |
|  | 4 | ✓ | ✓ | ✓ |
|  | 5 | ✓ | ✓ | ✓ |
|  | 12 | ✓ |  | ✓ |
|  | 13 | ✓ | ✓ |  |
| SIGNALING PROTOCOL | UMTS | ✓ |  | ✓ |
|  | WCDMA |  | ✓ |  |
| OUTPUT POWER (mW) | 300 | ✓ |  |  |
|  | 200 |  |  | ✓ |
|  | 100 |  | ✓ |  |
| BANDWIDTH (MHz) | 4.0 | ✓ |  | ✓ |
|  | 2.0 |  | ✓ |  |

FIG. 5

OPERATIONAL PARAMETER SELECTION TO AVOID INTERFERENCE IN A WIRELESS COMMUNICATION SYSTEM

CROSS-REFERENCE TO RELATED APPLICATIONS

This application is a continuation of U.S. patent application Ser. No. 13/445,799, Apr. 12, 2012, now U.S. Pat. No. 8,422,965, which is hereby incorporated by reference in its entirety, and which is a continuation of U.S. patent application Ser. No. 12/191,991, filed Aug. 14, 2008, now U.S. Pat. No. 8,160,508, which is hereby incorporated by reference in its entirety.

BACKGROUND OF THE INVENTION

1. Technical Field

The present invention is directed generally to wireless communication systems and, more particularly, to a system and method for parameter selection to avoid interference in a wireless communication system.

2. Description of the Related Art

Early wireless communication devices, commonly known as cell phones, provided wireless voice services to the user. These early phones have been replaced with wireless communication devices capable of delivering voice, data, and multi-media information. In addition, wireless devices often include location determination using the Global Positioning System (GPS). The delivery of these additional services requires additional bandwidth. In some cases, bandwidth previously allocated for one purpose has been reassigned for the delivery of wireless communication services. For example, the spectrum originally allocated to Ultra-High Frequency (UHF) television has been partially reallocated for wireless communication services.

Devices are being designed with multiple services that depend on multiple radio systems being operated at the same time. For example, devices are being designed that can connect to the cellular network using several different radio protocols and frequency bands. In addition, these devices may have other applications, such as broadcast television or Bluetooth, which use independent radio systems.

These independent radio systems may interfere with, or be interfered by, the radio system used for cellular operation. One can appreciate that the operation of multiple transceivers within a single device may decrease the operational capability of the device. Therefore, it can be appreciated that there is a significant need to reduce interference among the multiple transceiver systems. The present invention provides this, and other advantages, as will be apparent from the following detailed description and accompanying figures.

BRIEF DESCRIPTION OF THE DRAWINGS

FIG. 3 is a data table illustrating band selection capabilities for the wireless device of FIG. 2.

FIG. 4 is a table illustrating an alternative display of data from the table of FIG. 3.

FIG. 5 is a table illustrating the selection of other operational parameters to avoid interference in the wireless communication system described herein.

DETAILED DESCRIPTION

The increased demand for wireless communication capabilities has led to the reassignment of several UHF channels from normal broadcast television to wireless communication services. For example, UHF channel 55, which covers approximately 716 MHz-722 MHz, has been assigned for broadcast television services for use with wireless communication. For example, one company has developed a technology known as media forward link only (mediaFLO), which utilizes this allocated portion of the spectrum. Similarly, operation in the UHF band may cause interference with network-assisted GPS (AGPS). Currently, GPS operates at 1545.72 MHz with a bandwidth of at least 10.0 MHz. A transmitter operating at 772.86 MHz is likely to generate second harmonic distortion, which will cause interference at 1545.72 MHz thus interfering with GPS operation.

As a result of new allocation of services in the 700 MHz portion of the spectrum, this problem becomes more acute given the fact that portions of this spectrum have also been reallocated for conventional wireless communication. Thus, there is an increased chance of interference among the various wireless services. It is essential that the device maintain normal cellular communication even when auxiliary devices, such as broadcast television reception, are activated. The user must be able to receive incoming calls and place calls. The goal is to maintain the normal communications capability while reducing interference with auxiliary communication capabilities.

While it is desirable to have a wireless communication device with many capabilities, such as broadcast television reception, AGPS, and Bluetooth in combination with conventional cellular communication services, the design of such a device is difficult. This is especially true when it is also desirable to make the wireless communication device small and lightweight.

The wireless communication device described herein may include multiple capabilities, such as those described above, and still be designed to fit within a small, lightweight package. Wireless communication devices described herein have a range of predetermined operational capabilities that will be limited when the user elects to operate some of the additional auxiliary services. For example, when the user elects to operate the AGPS capability within the wireless device, the operational characteristics for other forms of communication may be limited during the operation of the AGPS.

Figure 1:
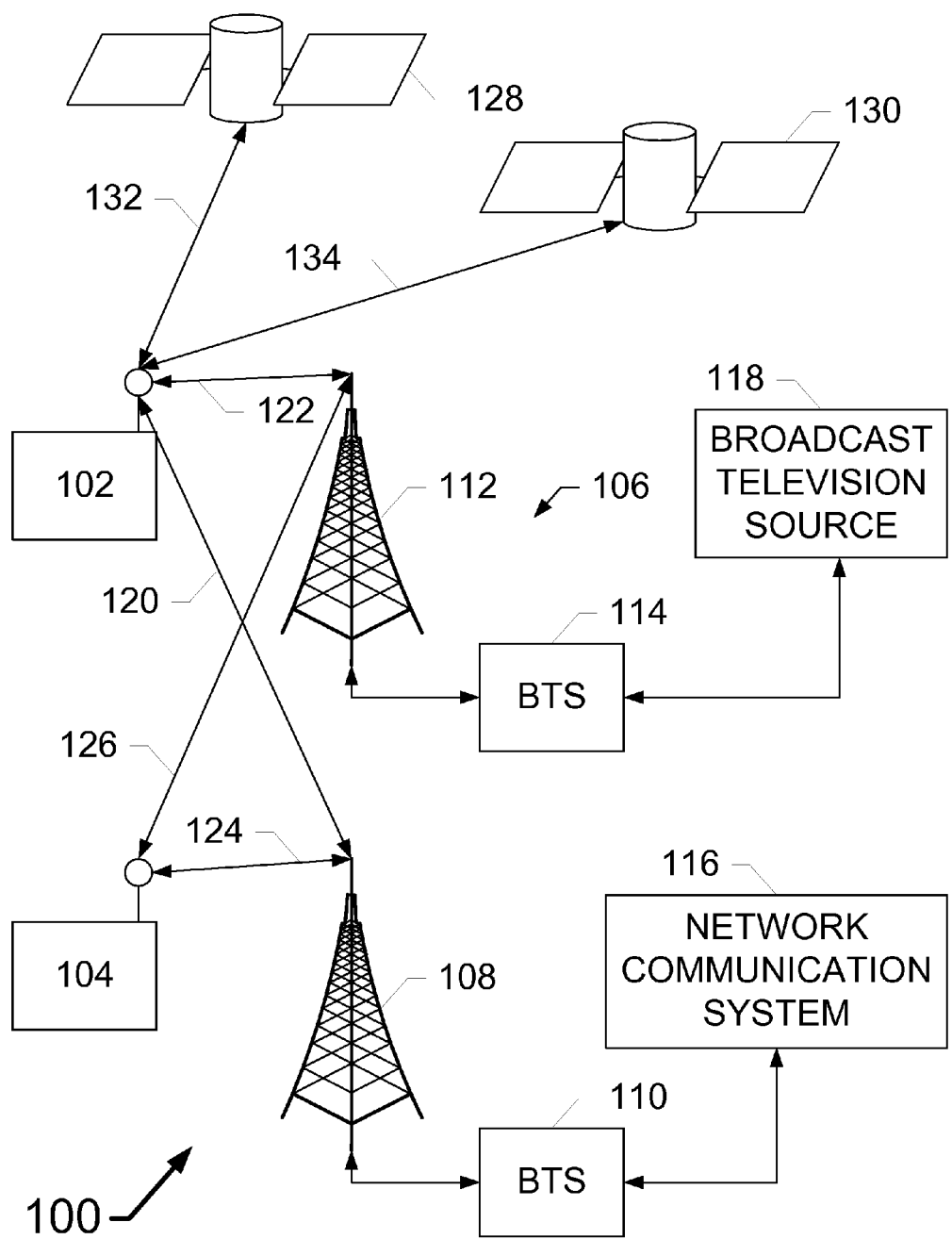
FIG. 1 is a diagram illustrating an architecture that may be used to implement the wireless communication system described herein.

FIG. 1 illustrates a wireless communication system 100 constructed in accordance with the present teachings. As illustrated in FIG. 1, wireless communication devices 102 and 104 communicate with a communication network 106.

The communication network 106 includes a base station 108, controlled by a base station transceiver system (BTS) 110 and a base station 112 controlled by a BTS 114. Those skilled in the art will appreciate that FIG. 1 is a simplified depiction of a normal communication network. Typically, the communication network 106 would include a large number of base stations capable of communicating with a large number of wireless communication devices. However, for the sake of simplicity in understanding the present teachings, the simplified diagram of FIG. 1 will suffice. Furthermore, the operation of the base stations in communicating with wireless communication devices is well known in the art and need not be described in greater detail herein. What will be described in greater detail is the limitation of communication capabilities by a particular wireless communication device when multiple communication systems are active.

In the illustration of FIG. 1, a network communication system 116 provides normal cellular communication capabilities to the communication network 106. For the sake of simplicity, the network communication system 116 is illustrated in FIG. 1 as a single block. However, those skilled in the art will appreciate that the network communication system 116 may include a large number of elements, such as a mobile switching center, connection to a public switch telephone network (PSTN), network control modes, and the like. In addition, the network communication system 116 may include access gateways that allow additional services, such as Internet access, to users of the wireless communication devices 102-104. However, for the sake of simplicity, all of these conventional components are illustrated in FIG. 1 simply as the network communication system 116.

In addition, FIG. 1 illustrates a broadcast television source 118. The broadcast television source 118 is intended to include any broadcast television signal, such as commercial television, public television, private or proprietary television, or the like. For example, the network service provider may have proprietary broadcast available for the users of the wireless communication devices 102-104. In addition, the broadcast television source 118 may include, by way of example, video clips or other multimedia data sources. For example, video clips may be provided from the Internet or other sources and provided as part of the broadcast television source 118. The system 100 is not limited by the specific source of the broadcast television data.

In FIG. 1, the network communication system 116 is illustrated as coupled to the BTS 110 for broadcast by the base station 108. The broadcast television source 118 is illustrated as coupled to the BTS 114 for broadcast by the base station 112. However, those skilled in the art will appreciate that the system 100 may be readily implemented with a single base station carrying both network communications from the network communication system 116 as well as broadcast television from the broadcast television source 118. Such a combination would typically require additional transceivers on the base station carrying both signal sources. For this reason, FIG. 1 illustrates the network communications system utilizing the base station 108 and the broadcast television source utilizing the base station 112.

In the system 100 of FIG. 1, the wireless communication device 102 communicates with the base station 108 via a communication link 120 and may also communicate with the base station 112 via a communication link 122. Similarly, the wireless communication device 104 may communicate with the base station 108 via a communication link 124 and may communicate with the base station 112 via a communication link 126.

FIG. 1 also illustrates satellites 128 and 130, which may be part of a GPS satellite array. The satellites 128 and 130 transmit timing information that may be received by the wireless communication device 102 via communication links 132 and 134, respectively. As is known in the art, the timing signals received from the satellites 128 and 130 are utilized to determine the precise location of the mobile communication device 102. In some situations, the mobile communication device 102 may be in a position where it does not receive signals from the satellites 128 and 130 or receives information from only one satellite. For example, the mobile communication device 102 may be in a city where buildings block out reception of satellite signals or inside a building where satellite reception is poor. In these situations, the network may provide additional location information, in a process known as AGPS, to determine the location of the mobile communication device 102. Network data may also be used to speed up the acquisition of GPS signals.

Figure 2:
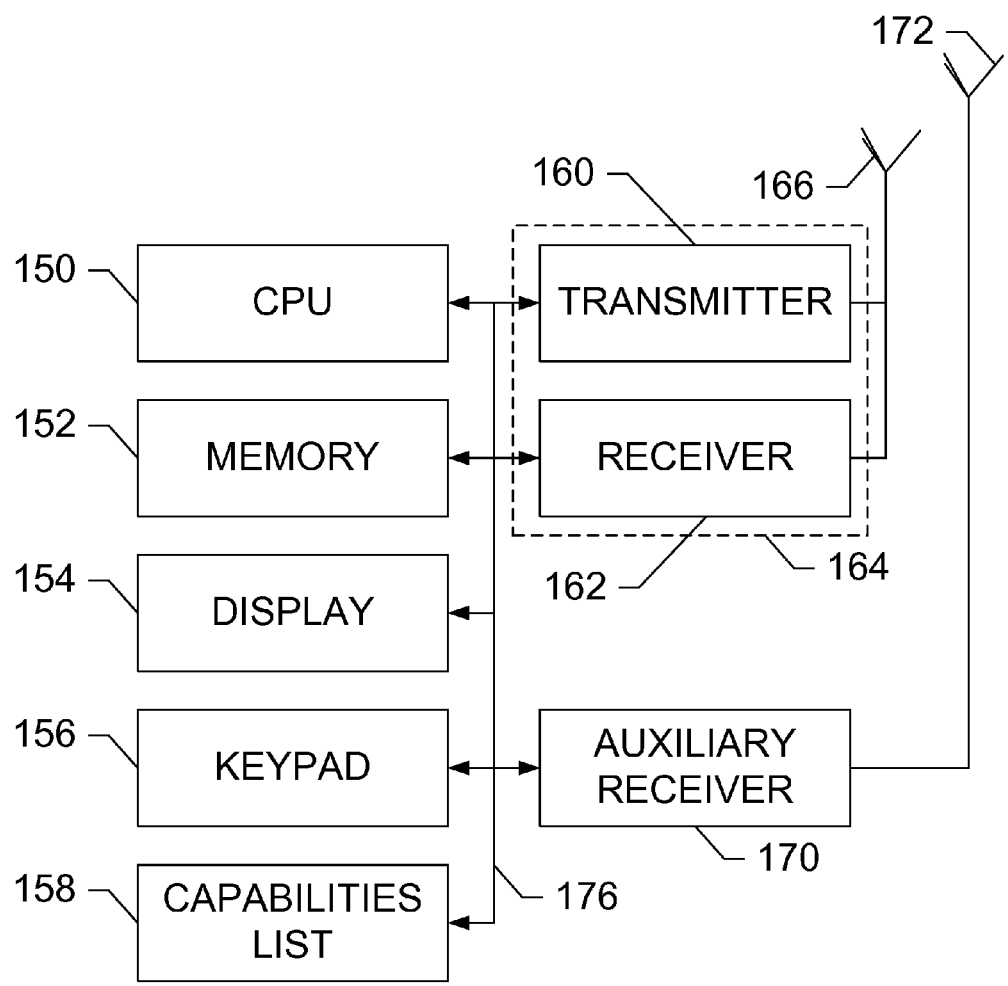
FIG. 2 is a functional block diagram of a mobile wireless device constructed in accordance with the present teachings.

FIG. 2 is a functional block diagram of a wireless communication device, such as the wireless communication device 102 in FIG. 1. The device includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The system 100 is not limited by the specific form of the CPU 150.

The wireless communication device 102 also contains a memory 152. The memory 152 may store instructions and data to control operation of the CPU 150. The memory 152 may include random access memory, ready-only memory, programmable memory, flash memory, and the like. The system 100 is not limited by any specific form of hardware used to implement the memory 152. The memory 152 may also be integrally formed in whole or in part with the CPU 150.

The mobile communication device 102 also includes conventional components, such as a display 154, a keypad 156, and audio output (not shown). These are conventional components that operate in a known manner and need not be described in greater detail. The block diagram of FIG. 2 also includes a capabilities list 158. The capabilities list 158 may be formed as part of the memory 152. However, it is shown as a separate block in the functional block diagram of FIG. 2 since it performs a separate function.

As will be described in greater detail below, operation of the wireless communication device 102 is controlled by selecting operating parameters from the capabilities list 158. When the wireless communication device 102 is operating only as a cellular phone, the full capabilities list may be utilized to optimally select the operational parameters for the device. However, when the user activates (manual activation or automatic activation) an auxiliary device, such as broadcast television, the capabilities list may be altered to reduce the capabilities that may be selected for operation of the wireless communication device. The reduced capabilities list is selected to reduce the interference between the multiple operational modes. Details of the parameter selection process will be provided below.

The wireless communication device 102 also includes a transmitter 160 and receiver 162 such as may be used for normal wireless communication with the network communication system 116 (see FIG. 1). FIG. 2 also illustrates a receiver 162 that operates in conjunction with the transmitter 160 to communicate with the communication network 106. In a typical embodiment, the transmitter 160 and receiver 162 are implemented as a transceiver 164. The transceiver 164 is connected to an antenna 166. Operation of the transceiver 164 and the antenna 166 is well-known in the art and need not be described in greater detail herein.

The wireless communication device 102 also includes a second auxiliary receiver 170. The auxiliary receiver 170 may provide additional capabilities, such as broadcast television reception, AGPS, or the like. The auxiliary receiver 170 is coupled to an antenna 172. Those skilled in the art of radio design will appreciate that some circuit components can be combined. The antenna 166 and antenna 172 can be combined, but typically are implemented as separate components. Similarly some parts of a GPS receiver, such as digital portions of the receiver, may be integrated into the cellular baseband receiver portion.

The various components illustrated in FIG. 2 are coupled together by a bus system 176. The bus system may include an address bus, data bus, power bus, control bus, and the like. For the sake of convenience, the various busses in FIG. 2 are illustrated as the bus system 176.

The operation of the wireless communication device 102 may now be described in greater detail. As described above, certain portions of the radio frequency spectrum have been reallocated from UHF broadcast television or other purposes to use for cellular systems, broadcast television for use by wireless communication devices, GPS, and the like. The terms "band" and "channel" both refer to some allocation of a portion of the radio frequency spectrum. In this sense, the terms "band" and "channel" are interchangeable. The allocation of specific frequencies for use by service providers is typically governed by the Federal Communications Commission (FCC) and/or industry organizations. For example, the 700 MHz portion of the spectrum is divided into a number of channels by industry agreement. The industry standard, known as 3GPP, specifies bands 1-20 for a portion of the spectrum previously assigned for UHF broadcast television. Individual bands may be used for certain services, some of which were permitted by the FCC independent of the 3GPP standard. For example, band 12 has been designated for broadcast television, such as MediaFLO. In addition, certain bands may be allocated to individual service providers.

FIG. 3 illustrates an example of the capabilities list 158 in the form of a table in which a selected portion of bands 1-20 have been allocated for possible use by the wireless communication device 102. The capabilities list 158 (see FIG. 2) contains a list of the bands that are available for use by the wireless communication device 102. As those skilled in the art can appreciate, the wireless communication device 102 will attempt to register with the wireless communication system 106 using one of the bands permitted in the capabilities list 158. In the example illustrated in FIG. 3, the first column contains the full capabilities table for band selection and lists bands 1, 2, 4, 5, 12, and 13 for possible use in communications. As those skilled in the art will appreciate, the wireless communication device 102 will register with the communication network 106 using one of these permitted bands.

The registration process itself may differ from one service provider to another and from one signaling protocol to another. For example, the registration process for a GSM service provider may differ from the registration process for a CDMA service provider. However, the registration process for the various protocols is well known in the art and need not be described in greater detail herein.

Once the wireless communication device 102 has registered with the communication network 106, communications can occur in a conventional fashion. In some communication systems, the wireless communication device 102 may transmit its capabilities list 158 (see FIG. 2) to the communication network 106. The transmission of the capabilities list 158 may occur upon registration, upon request by some portion of the communication network 106, periodically at some determined time interval, or upon the occurrence of some triggering event. A triggering event may, for example, comprise user activation of the wireless communication device 102 for a normal voice communication, during a hand-off of the wireless communication device 102 due to a change in location of the wireless communication device, or the like. In accordance with the teachings herein, another triggering event that can cause the wireless communication device 102 to transmit its capabilities list 158 is the activation of additional data reception by the wireless communication device. For example, the user may wish to receive broadcast television signals or activate a location determination using AGPS. As will be described in greater detail below, the activation of these additional services may cause a reduction in the available capabilities contained in the capabilities list 158. Upon the activation of these services, the reduced or limited capabilities list 158 may be transmitted to the communication network 106 (see FIG. 1) so as to advise the communication network of the reduced capabilities of the wireless communication device.

In the example table of FIG. 3, only band selection is illustrated as a capability. In normal operation, the full capabilities list 158 (see FIG. 2) allows the wireless communication device 102 to communicate on any of bands 1, 2, 4, 5, 12, or 13. However, if the user sends a request to receive broadcast television, which is transmitted on band 12, the capabilities list 158 is altered in the manner shown in the second column of FIG. 3 for broadcast television. In this example, band 12 has been eliminated as for possible use by the wireless communication device 102 for normal communications with the communications network 106. If the transceiver 164 (see FIG. 2) is not permitted to operate on band 12, interference between the broadcast television signal on band 12 and other operations with the wireless communication device on one of the permitted bands (i.e., bands 1, 2, 4, 5, or 13) is reduced or eliminated.

In the other example illustrated in FIG. 3, the user may operate the keypad 156 (see FIG. 2) on the wireless communication device 102 to activate the AGPS service. As discussed above, operation of the cellular phone in band 13 may cause interference with GPS operation due to second harmonic interference. Upon activation of the AGPS capabilities of the wireless communication device 102, the wireless communication device will operate with the limited capabilities table illustrated in the third column of FIG. 3. That is, the wireless communication device will only utilize channels 1, 2, 4, 5, or 12 for normal communications. This effectively reduces potential interference with normal operation of the wireless communication device 102 and operation of the wireless communication device for AGPS services on band 13. Those skilled in the art will appreciate that other bands and other examples of auxiliary services may also be within the realm of the present disclosure.

In the table of FIG. 3, the wireless communication device may initially operate on any of the bands illustrated in the first column of FIG. 3. That is, the wireless communication device may initially register with the communications network 106 on any of the bands 1, 2, 4, 5, 12, or 13. If the wireless communication device has registered, by way of example, on band 4, activation of an auxiliary service, such as broadcast television or AGPS, will cause a change in the capabilities list 158, as described above. However, the wireless communication device 102 may continue to operate on band 4 in its normal fashion. If the wireless communication device must change bands due to, by way of example, a change in location, a hand-off from one base station to another may occur and the new band for communication between the wireless communication device 102 and the communication network 106 will occur on any of the bands in the limited capabilities list.

In a different situation, the wireless communication device 102 may have initially registered on, by way of example, band 12. In this example, the selection of broadcast television auxiliary service by the user of the wireless communication device 102 will require that the wireless communication device re-register with the communications network 106 using a band other than band 12, which will be used for broadcast television reception. Thus, the wireless communication device 102 in this example must immediately re-register and select a band from the limited capabilities table.

The table of FIG. 3 illustrates one example of a data list of normal capabilities and reduced capabilities for band selection. The same data may be presented in a different form, such as the table illustrated in FIG. 4. In FIG. 4, the normal band selection capabilities are listed in the first column and data flags may be used to indicate the availability (or lack of availability) of a particular band when the user selects auxiliary services such as broadcast television, shown in the second column in the table of FIG. 4, or AGPS, shown in the third column of FIG. 4. The tables of FIGS. 3 and 4 are presented merely as examples of ways in which band capabilities may be listed. Those skilled in the art will appreciate that any data structure may be suitable for such purposes. Thus, the system 100 is not limited by the specific form of data structure utilized to provide band selection capabilities.

The examples of FIGS. 3 and 4, as well as the description of the capabilities list 158 (see FIG. 2), have focused on band selection for the wireless communication device 102. However, other operational parameters may also be restricted or limited when auxiliary services are selected by the user. FIG. 5 is a table illustrating a number of possible parameters that may be selected alone, or in combination based on the operational mode of the wireless communication device 102. The selection of band has already been discussed in detail above. However, FIG. 5 also allows the selection of one or more signaling protocols, such as GSM, UMTS, or WCDMA. For example, GSM signaling may be preferable in the wireless communication device 102 when the auxiliary receiver is receiving broadcast television signals of SPG signals because GSM utilizes a narrower signal bandwidth than other signaling protocols.

The output power for the transceiver 164 (see FIG. 2) may also be limited based on the selection of the operational mode of the wireless communication device. In the example of FIG. 5, the output power of the transceiver 164 is reduced from 300 mW in normal operation and limited to 200 mW when broadcast television auxiliary services are selected and the output power of the transceiver may be further reduced to 100 mW if the AGPS auxiliary services are selected. In addition, it is possible to alter the bandwidth for the transceiver 164 based on the operational mode. In the example of FIG. 5, a 4.0 MHz bandwidth may be allocated to the transceiver during normal operation while the bandwidth is reduced 2.0 MHz when auxiliary service such as AGPS has been selected. Thus, a number of operational parameters may be altered based on the selection of auxiliary services. It should be noted that FIG. 5 is presented in the form of a data table with flags indicating acceptable operating parameters in each of the operational modes (i.e., normal mode, broadcast television mode, and AGPS mode).

Figure 6:
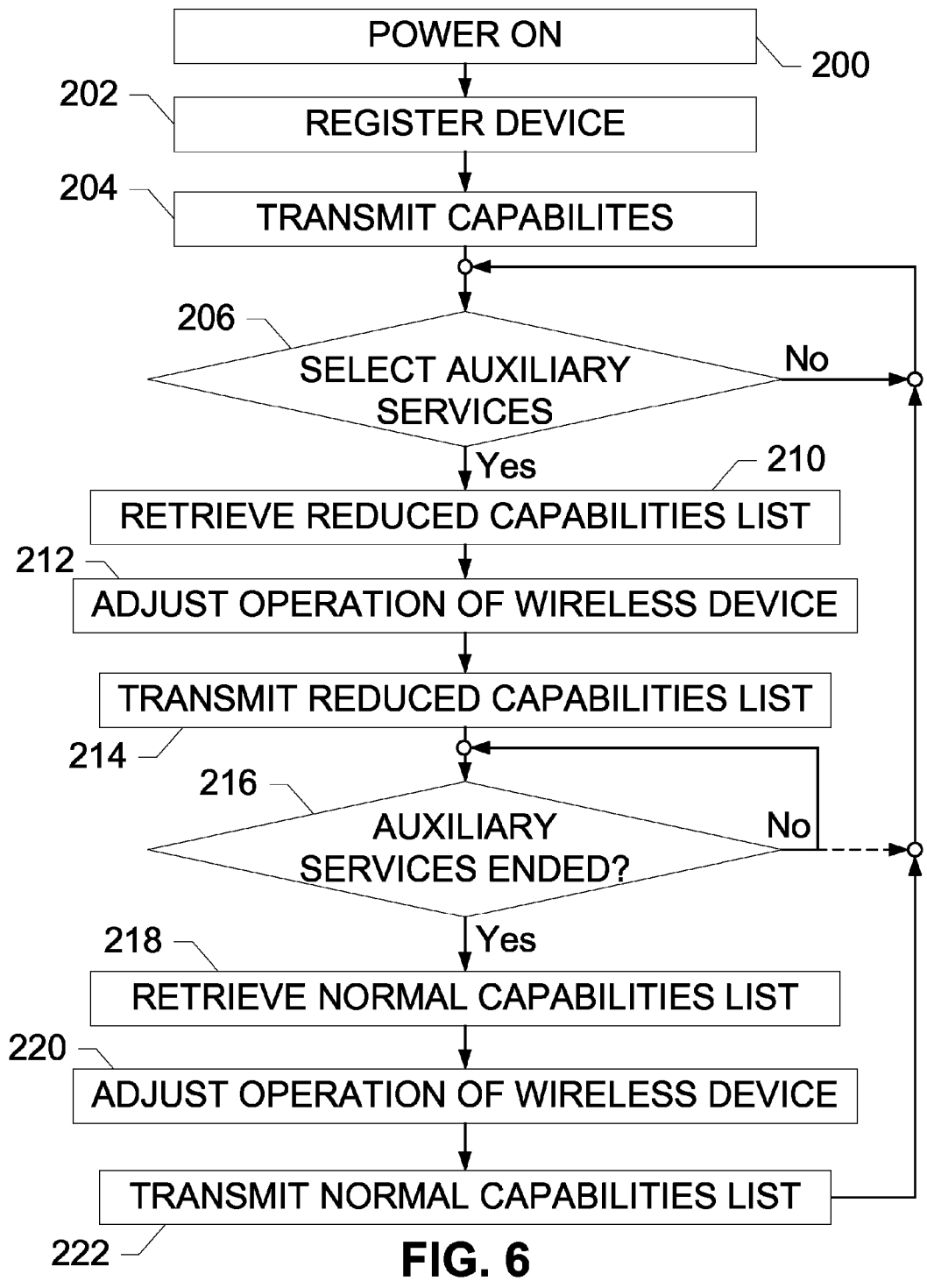
FIG. 6 is a flow chart illustrating the operation of the wireless communication system in accordance with the present teachings.

The operation of the wireless communication device is illustrated in the flowchart at FIG. 6. At 200, the power is applied to the wireless communication device (e.g., the wireless communication device 102). As part of the power-up process, the device registers with the communication network 106 at step 202. As previously discussed, the registration process may be different for different service providers and/or different communication protocols. However, registration itself is known in the art and need not be described in greater detail herein. In step 204, the wireless communication device 102 transmits its capabilities list 158 (see FIG. 2) to the communication network 106. In decision 206, the wireless communication device determines whether the user has selected any auxiliary services, such as broadcast television reception or AGPS location determination. As previously noted, the user may manually request these auxiliary services. Alternatively, the auxiliary services may be preprogrammed. For example, the user may request downloading of a broadcast television service in advance and, at the appropriate time, the wireless communication device 102 automatically initiates the request for auxiliary services. Similarly, the user may manually request a location determination using AGPS services. Alternatively, the communications network 106 may send a command to the wireless communication device 102 to automatically make a location determination. No matter how the auxiliary services are requested, the wireless communication device 102 determines whether auxiliary services have been selected in decision 206. If auxiliary services have not been requested, the resultant decision 206 is NO and, the system returns to the beginning of decision 206 and the wireless communication device 102 continues in normal operation.

If auxiliary services have been selected, the result of decision 206 is YES. In that event, the wireless communication device 102 retrieves the reduced capabilities list in step 210. As previously discussed, the reduced capabilities may be dependent on the particular auxiliary services that have been selected. For example, one set of reduced capabilities may be available for the wireless communication device if the auxiliary services selected are broadcast television. If the auxiliary services requested by the wireless communication device 102 are AGPS location determination services, a different set of reduced capabilities are retrieved.

In step 212, the wireless communication device adjusts its operation in accordance with the reduced operational capabilities. As previously discussed, the wireless communication device may not have to immediately alter its operational parameters depending on the current set of operational parameters and the requested auxiliary service. For example, if the wireless communication device 102 is already operating on a band that is contained within the reduced capabilities list, the wireless communication device need not immediately change bands. In this example, no action is taken at step 212.

In contrast, the wireless communication device may be operating on a band during normal operation that is not available during operation of the auxiliary services. In this event, the wireless communication device adjusts operation in step 212 by re-registering with the communication network 106 using the reduced capabilities list. In step 214, the wireless communication device 102 transmits the reduced capabilities list to the communications network 106 (see FIG. 1).

The wireless communication device continues cellular operation utilizing the reduced capabilities list so long as the auxiliary services are ongoing. When the auxiliary services have ended, the reverse process may occur to restore full capabilities to the wireless communication device 102. In decision 216, the wireless communication device 102 determines whether auxiliary services have ended. If auxiliary services are still ongoing (e.g., a broadcast television signal is being transmitted to the wireless communication device), the result of decision 216 is NO. In that event, the wireless communication device 102 may return to the beginning of decision 216 to await the termination of auxiliary services. Alternatively, the wireless communication device 102 may return to decision 206 to detect whether or not additional auxiliary services have been selected.

If auxiliary services have ended, the result of decision 216 is YES. In that event, the wireless communication device retrieves the normal capabilities list in step 218 and adjusts operation of the wireless communication device in step 220. As discussed above with respect to step 212, the wireless communication device might not have to adjust its operational parameters when the auxiliary services have terminated. For example, it could be that the wireless communication device never had to adjust its operational parameters in the first place if, for example, the selected band was not one that was prohibited during the use of auxiliary services. In this case, it may not be necessary to adjust operational parameters in step 220 when auxiliary services have terminated.

However, the band or other operational parameters, such as signaling protocol, output power, and bandwidth, may have been altered during the provision of auxiliary services through the wireless communication device 102. In this event, it may be desirable to restore the wireless communication device 102 to its normal operational capabilities so as to maximize normal operation. This adjustment of operational parameters in the wireless communication device occurs in step 220. In step 222, the wireless communication device transmits its restored or full capabilities list to the communication network 106 and returns to decision 206 to await the selection of additional auxiliary services.

It should be understood that the sequence listed in the flowchart of FIG. 6 is illustrative only and certain events may occur in different sequences without adversely affecting operation of the wireless communication device 102. For example, the transmission of capabilities in step 204 may occur as part of the device registration process of step 202. Similarly, the transmission of reduced capabilities list in step 214 may occur prior to the adjustment of operation of the wireless communication device in step 212. Similarly, the transmission of capabilities in step 222 may be performed before the adjustment of operation of the wireless communication device in step 220. Thus, the flowchart of FIG. 6 is intended as an illustrative example only.

The foregoing described embodiments depict different components contained within, or connected with, different other components. It is to be understood that such depicted architectures are merely exemplary, and that in fact many other architectures can be implemented which achieve the same functionality.

For example, the present discussion included embodiments of networks constructed in accordance with the 3GPP standard. However, those skilled in the art will appreciate that the bands referred to in the examples are specific to the 3GPP standard used when talking about LTE and UMTS. Those skilled in the art will appreciate that other systems, such as GSM or CDMA may utilize other frequencies and that the bands referred to in the 3GPP examples have analogous assigned bands in other telecommunications networks. For example, GSM operates in the 850 MHz band and/or the 1900 MHz bands. Those skilled in the art will appreciate that the principles of the present invention are applicable for other system protocols and frequency bands.

In addition, the examples of broadcast television and AGPS provide a good illustration of cases where the reception of an auxiliary signal is interfered with by the transmitter for the cellular service. However, the principles described herein are also appropriate when a wireless communication device (e.g., the wireless communication device 102 of FIG. 1) includes a WiMax or WiFi transceiver could transmit in adjacent UMTS or LTE receive band. In this example, the capabilities list (e.g., the capabilities list 158 of FIG. 2) would change so that the wireless communication device would not operate in this band if WiMax is on. In an alternative embodiment, the capabilities list could include a table for WiMax or WiFi so that the WiMax/WiFi is limited in bandwidth or power. Thus, the capabilities list 158 could apply to the cellular portion of the wireless communication device 102, or could equally apply to the auxiliary receiver 170 or an auxiliary transmitter (not shown) within the wireless communication device.

In yet another example, short-range devices, such as a Bluetooth device may typically operate in the 2.4 GHz or the 4.2 GHz bands. In this example, Bluetooth operation may interfere with cellular operation at or near the Bluetooth frequencies or harmonics of those frequencies. Similarly, operation of the wireless communication device may cause interference at harmonics which correspond to the operational bands for Bluetooth devices. In these examples, it is possible to have a capabilities list (e.g., capabilities list 158 of FIG. 2) that limits the capabilities of the Bluetooth device. Alternatively, the capabilities list 158 may include limited capabilities for the cellular device when Bluetooth operation is enabled. Thus, the principles of the capabilities list 158 may be applicable to the cellular device or the auxiliary device as appropriate. Those skilled in the art will recognize this broad applicability and the applicability of the present invention to other signaling protocols, wireless communication devices and frequency bands.

In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations).

Accordingly, the invention is not limited except as by the appended claims.

What is claimed is:

1. A device comprising:
a first receiver that communicates using a plurality of communication bands;
a first transmitter that communicates using the plurality of communication bands;
a second receiver that communicates using a first communication band of the plurality of communication bands, wherein the second receiver is selectively activated;
a data storage structure that stores data related to operational capabilities of the first receiver and the first transmitter, the operational capabilities comprising a set of communication bands of the plurality of communication bands on which the first receiver and the first transmitter can communicate when the second receiver is selectively activated; and
a controller that controls operation of the first receiver and the first transmitter by selecting a communication band from the set of communication bands based on the data in the data structure when the second receiver is selectively activated,
wherein the first receiver and the first transmitter communicate using an initial communication band of the plurality of communication bands when the second receiver is not activated, and
wherein the controller alters the initial communication band on which the first receiver and the first transmitter are communicating if the initial communication band is not one of the set of communication bands when the second receiver is activated.

2. The device in claim 1, wherein the controller further causes a re-registration process upon alteration of the initial communication band on which the first receiver and the first transmitter are communicating.

3. The device in claim 1, wherein the second receiver is part of an auxiliary transceiver.

4. The device in claim 1, wherein the data storage structure stores data related to operational capabilities including a signaling protocol, a transmission power level, and a bandwidth.

5. The device in claim 1, wherein the second receiver is contained within a housing containing the first transmitter and the first receiver.

6. The device in claim 1, wherein the second receiver receives signals from a global positioning system satellite.

7. A method comprising:
communicating, using a wireless communication device comprising a processor, using a plurality of communication bands;
determining, by the wireless communication device, that an auxiliary receiver in the wireless communication device is activated;
determining, by the wireless communication device, that the wireless communication device is not communicating on any of a set of communication bands of the plurality of communication bands on which the wireless communication device communicates when the auxiliary receiver is activated;
altering, by the wireless communication device, operation of the wireless communication device to communicate using one of the set of communication bands; and
re-registering, by the wireless communication device, the wireless communication device with a communications network using the one of the set of communication bands.

8. The method in claim 7, wherein the wireless communication device communicates using the one of the set of communication bands while the auxiliary device is activated.

9. The method in claim 7, further comprising determining that the auxiliary receiver is deactivated.

10. The method in claim 9, further comprising altering operation of the wireless communication device to communicate using the one of the set of communication bands.

11. The method in claim 7, wherein the auxiliary receiver is activated to receive broadcast television signals.

12. The method in claim 7, wherein the auxiliary receiver is activated to receive signals from a global positioning system satellite.

13. The method in claim 7, further comprising transmitting, to the communications network, data indicating operational capabilities of the first receiver and the first transmitter, including the one of the set of communication bands on which the first receiver and the first transmitter operate.

14. A non-transitory computer-readable medium having computer instructions stored thereon that, when executed by a processor, causes the processor to perform operations comprising:
determining that an auxiliary receiver of a wireless communication device that communicates using a plurality of communication bands is activated;
determining that the wireless communication device is not communicating on any of a set of communication bands of the plurality of communication bands on which the wireless communication device communicates when the auxiliary receiver is activated;
altering operation of the wireless communication device to communicate using one of the set of communication bands; and
re-registering the wireless communication device with a communications network using the one of the set of communication bands.

15. The computer-readable medium in claim 14, wherein the wireless communication device communicates using the one of the set of communication bands while the auxiliary device is activated.

16. The computer-readable medium in claim 14, wherein the execution of the computer instructions causes the processor to perform operations further comprising determining that the auxiliary receiver has been deactivated.

17. The method in claim 16, wherein the execution of the computer instructions causes the processor to perform operations further comprising altering operation of the wireless communication device to communicate using one of the plurality of communication bands.

18. The method in claim 14, wherein the auxiliary receiver is activated to receive broadcast television signals.

19. The method in claim 14, wherein the auxiliary receiver is activated to receive signals from a global positioning system satellite.

20. The method in claim 14, wherein the execution of the computer instructions causes the processor to perform operations further comprising transmitting, to the communications network, data indicating current operational capabilities of the first receiver and the first transmitter, including the one of the set of communication bands on which the first receiver and the first transmitter are operating.

* * * * *